(12) United States Patent
Hatzor

(10) Patent No.: US 10,202,104 B2
(45) Date of Patent: Feb. 12, 2019

(54) WINDOW WASHER AND WASHING METHOD

(71) Applicant: Ehood Yaaqov Hatzor, Vered Yericho (IL)

(72) Inventor: Ehood Yaaqov Hatzor, Vered Yericho (IL)

( * ) Notice: Subject to any disclaimer, the term of this patent is extended or adjusted under 35 U.S.C. 154(b) by 307 days.

(21) Appl. No.: 14/534,216

(22) Filed: Nov. 6, 2014

(65) Prior Publication Data

US 2016/0129885 A1 May 12, 2016

(51) Int. Cl.
*B60S 1/34* (2006.01)
*B60S 1/38* (2006.01)
*B60S 1/36* (2006.01)

(52) U.S. Cl.
CPC ........... *B60S 1/3848* (2013.01); *B60S 1/3404* (2013.01); *B60S 1/365* (2013.01); *B60S 2001/3831* (2013.01); *B60S 2001/3834* (2013.01); *B60S 2001/3837* (2013.01)

(58) Field of Classification Search
CPC .......... B60S 1/365; B60S 1/3404; B60S 1/38; B60S 1/3801; B60S 1/08; B60S 2001/3831; B60S 2001/3834; B60S 2001/3837
USPC ............................. 15/250.21, 250.23, 250.41
See application file for complete search history.

(56) References Cited

U.S. PATENT DOCUMENTS

| | | | | |
|---|---|---|---|---|
| 2,607,944 A * | 8/1952 | Turner | ...................... | B60S 1/28 15/250.04 |
| 2,784,437 A * | 3/1957 | Haas Albert D | ......... | B60S 1/38 15/250.22 |
| 3,092,865 A * | 6/1963 | Massoud | ................... | B60S 1/28 15/250.23 |
| 3,138,816 A * | 6/1964 | Abodeely | ............. | B60S 1/3801 15/250.41 |
| 4,339,839 A * | 7/1982 | Knights | .................... | B60S 1/38 15/250.04 |
| 4,611,364 A * | 9/1986 | Grubner | ................ | B60S 1/3801 15/250.03 |
| 4,787,115 A * | 11/1988 | Clokie | ...................... | B60S 1/28 15/250.21 |
| 8,745,814 B2 * | 6/2014 | Nelson | ................... | B60S 1/3801 15/250.23 |
| 2009/0083929 A1* | 4/2009 | Peng | ..................... | B60S 1/3881 15/250.41 |
| 2011/0197387 A1 | 8/2011 | Nelson | | |

FOREIGN PATENT DOCUMENTS

| | | | |
|---|---|---|---|
| CN | 203221830 | * | 10/2013 |
| DE | 2700527 | * | 9/1978 |

OTHER PUBLICATIONS

Machine translation of description portion of Chinese publication 203221830, published Oct. 2013.*
https://www.clear.rice.edu/elec201/Book/basic_mech.html.

* cited by examiner

*Primary Examiner* — Gary K. Graham
(74) *Attorney, Agent, or Firm* — Alphapatent Associates, Ltd; Daniel J. Swirsky

(57) ABSTRACT

A window washer having a brushing arm mounted to a wiping arm of the window washer, and a motion conversion mechanism for converting back and forth rotational motion of the wiping arm to back and forth linear motion of the brushing arm, thereby the brushing arm rotates with the wiping arm motion, and in addition, linearly slides back and forth from the wiping arm, for brushing a window.

9 Claims, 5 Drawing Sheets

US 10,202,104 B2

WINDOW WASHER AND WASHING METHOD

TECHNICAL FIELD

The invention relates to the field of window washers, such as of vehicles. More particularly, the invention relates to a method and apparatus for washing a window.

BACKGROUND

A vehicle includes a wiping arm, featuring a wiping element. A wiping mechanism of the vehicle includes an electrical motor, for rotating the wiping arm back and forth. The wiping element is designed for wiping water present or intentionally splashed water present on the vehicle window.

However, the wiping element does not provide satisfactory brushing to the window, and thus the wiping element does not remove stuck dirt.

In contrast to the typical "slow" and long range motions of the wiping element, satisfactory removal of stuck dirt typically requires swift back and forth motions.

SUMMARY

A method and apparatus are provided for using the vehicle window washer for satisfactorily removing stuck dirt.

In one aspect of the invention, the invention is directed to a window washer, having
  a brushing arm, mounted to a wiping arm of the window washer; and
  a motion conversion mechanism, for converting back and forth rotational motion of the wiping arm to back and forth linear motion of the brushing arm,
  thereby the brushing arm rotates with the wiping arm motion, and in addition, linearly slides back and forth from the wiping arm, for brushing a window.

The motion conversion mechanism, for converting the back and forth rotational motion of the wiping arm to linear motion of the brushing arm, may include
  a first wheel, being pressed on the window, for being rotated by the window.

The motion conversion mechanism, for converting the back and forth rotational motion of the wiping arm to linear motion of the brushing arm, may further include
  a crankshaft, for converting the rotation of the first wheel to linear motion of the brushing arm.

The first wheel may include a spring element, for pressing the first wheel on the window.

The first wheel may include a rubber surrounding, for rolling thereon on the window.

The motion conversion mechanism, for converting the back and forth rotational motion of the wiping arm to linear motion of the brushing arm, may include
  a first wheel, being pressed on the window, for rolling along the window;
  a second wheel, connected to the first wheel via a gear, for being rotated parallel to the window by the first wheel; and
  an arm, pivotally connected to the brushing arm and to the second wheel, for converting the rotation of the second wheel to linear motion of the brushing arm.

The wiping arm may be rigidly fixed to a main arm extending from a wiping mechanism.

The window washer may further include
  a connecting element,
    for rigidly connecting the main arm to the wiping arm, and
    for slideably connecting the brushing arm to the wiping arm.

The brushing arm may include a brush, for brushing the window.

The motion conversion mechanism may convert a single rotational motion of the wiping arm to a plurality of linear back and forth motions of the brushing arm.

The linear motion of the brushing arm may be perpendicular to the rotational motion of the wiping arm.

The linear motion of the brushing arm may be parallel to the rotational motion of the wiping arm.

In another aspect, the invention is directed to a method for washing a window, the method including the steps of:
  mounting a brushing arm to a wiping arm of a window washer; and
  converting back and forth rotational motion of the wiping arm to linear motion of the brushing arm,
  thereby the brushing arm rotates with the wiping arm motion, and in addition, linearly slides back and forth from the wiping arm, for brushing a window.

The step of converting back and forth rotational motion of the wiping arm to linear motion of the brushing arm, may convert a single rotational motion of the wiping arm to a plurality of linear back and forth motions of the brushing arm.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments, features, aspects and advantages of the invention are described herein in conjunction with the following drawings.

It should be understood that the drawings are not necessarily drawn to scale.

DETAILED DESCRIPTION

The invention will be understood from the following detailed description of embodiments, which are meant to be descriptive and not limiting. For the sake of brevity, some well-known features, methods, systems, procedures, components, circuits, and so on, are not described in detail.

The examples herein use an embodiment of a vehicle window. However, the invention refers to any other similar window, for instance an aircraft window.

Figure 1:
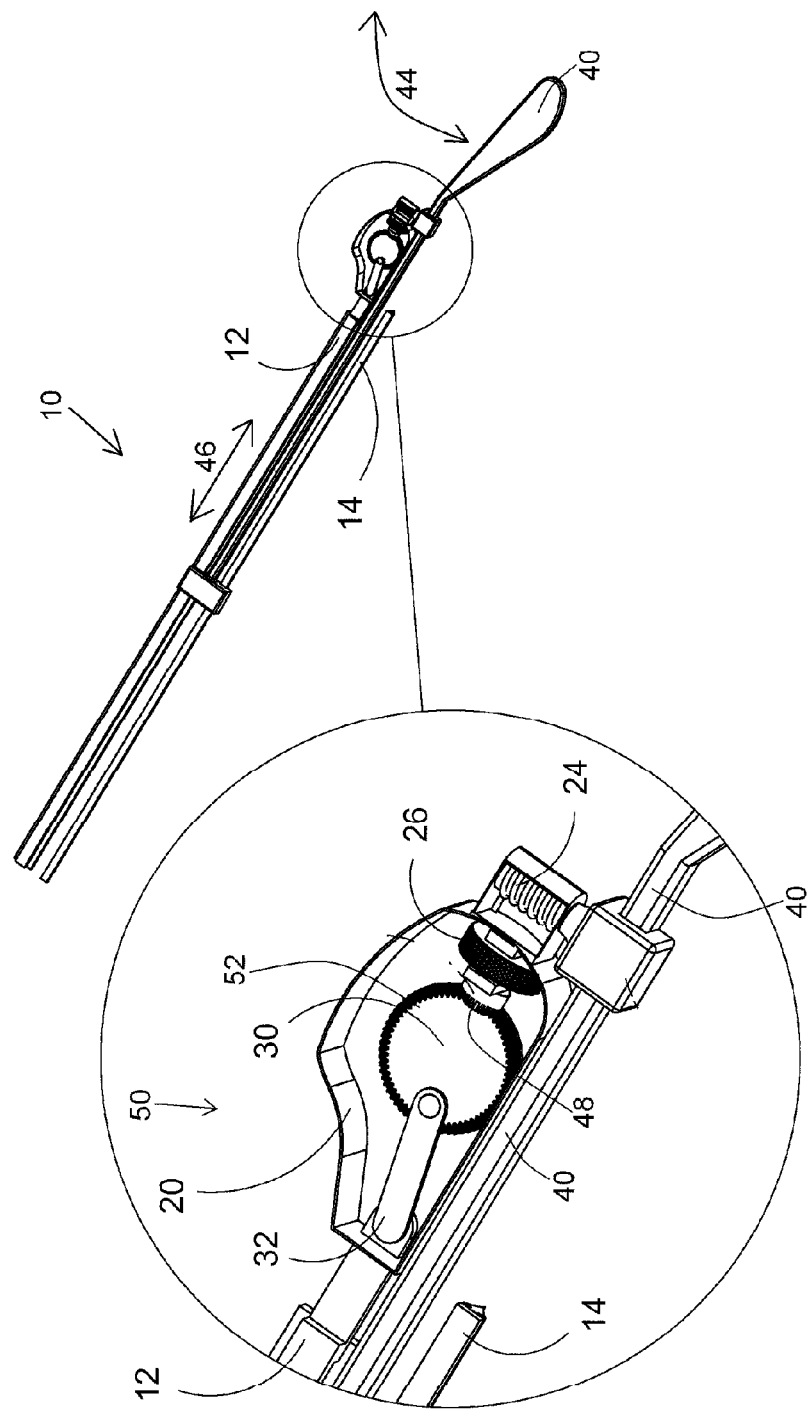
FIG. 1 is a front view of a window vehicle washer, according to one embodiment of the invention.

FIG. 1 is a front view of a window vehicle washer, according to one embodiment of the invention.

Figure 2:
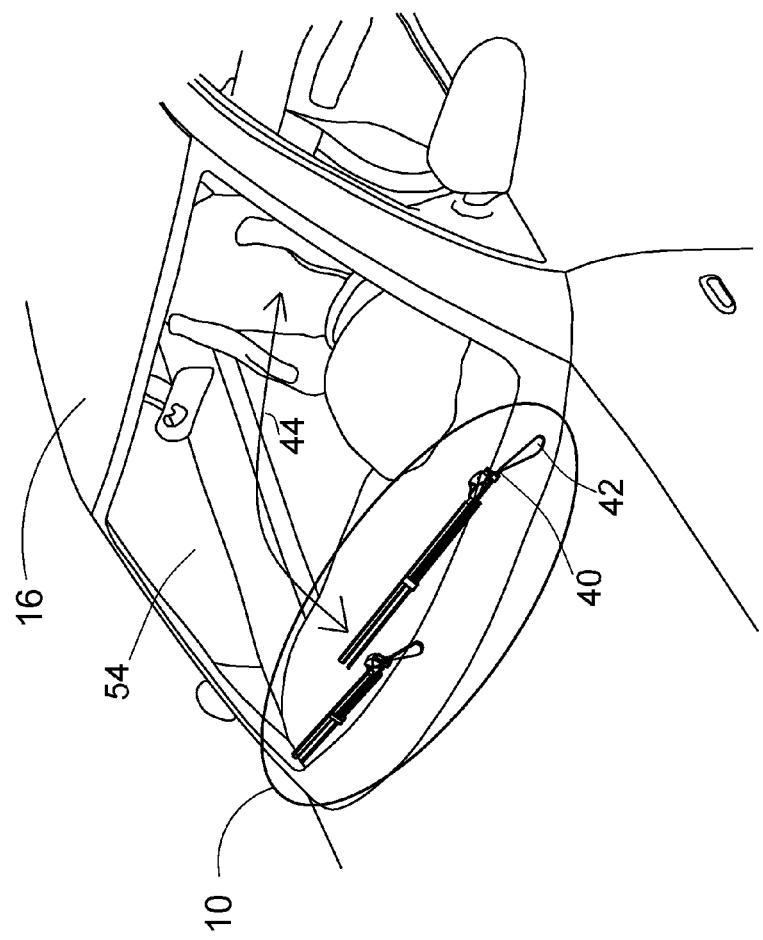
FIG. 2 depicts the front view of the window vehicle washer of FIG. 1 when fixed to a vehicle.

FIG. 2 depicts the front view of the window vehicle washer of FIG. 1 when fixed to a vehicle.

A vehicle window washer 10 includes, except for the prior art, wiping arm 14, a brushing arm 12. Wiping arm 14 is rigidly secured to the main arm 40 extending from the wiping mechanism 42 of the vehicle 16.

The wiping mechanism 42 of the vehicle (prior art) rotates main arm 40 back and forth in a rotational motion 44. A motion conversion mechanism 20 converts the rotational motion 44 of main arm 40 to linear motion 46 of brushing arm 12. Thus, wiping arm 14 only rotates in rotational motion 44, whereas brushing arm 12 rotates in rotational motion 44 and also linearly moves in linear motion 46.

The term "crankshaft" refers herein to a common mechanism for converting rotation motion to linear motion or vice versa.

Motion conversion mechanism 20 includes a first wheel 26, being pressed on the window 54 of the vehicle 16, for being rotated by window 54; and a crankshaft 50, including a second wheel 30, rotated by first wheel 26, and an arm 32, for converting the rotation of wheel 30 to linear motion of arm 32.

The wiping mechanism 42 of the vehicle rotates main arm 40 back and forth; main arm 40 rolls first wheel 26 along the vehicle window 54; and a second wheel 30, connected to first wheel 26 via a gear, including cogs 48 and 52, for being rotated parallel to window 54 by first wheel 26. Cogs 48 of first wheel 26 convert the rolling motion of first wheel 26 to the rotation of second wheel 30 parallel to window 54, via cogs 52 of second wheel 30.

The rotation of second wheel 30 provides the back and forth linear motion to arm 32 via crankshaft 50.

Crankshaft 50 is designed to provide a plurality of back and forth motions, for each single motion of main arm 40, thus operating a plurality of brushing motions for each single motion of main arm 40.

The mechanical design for obtaining this requirement is natural, since the perimeter of first wheel 26, rolling along window 54, is sufficiently small, for rolling relatively many times for a full range single motion of main arm 40. Other parameters of crankshaft 50 provide the same.

Figure 3:
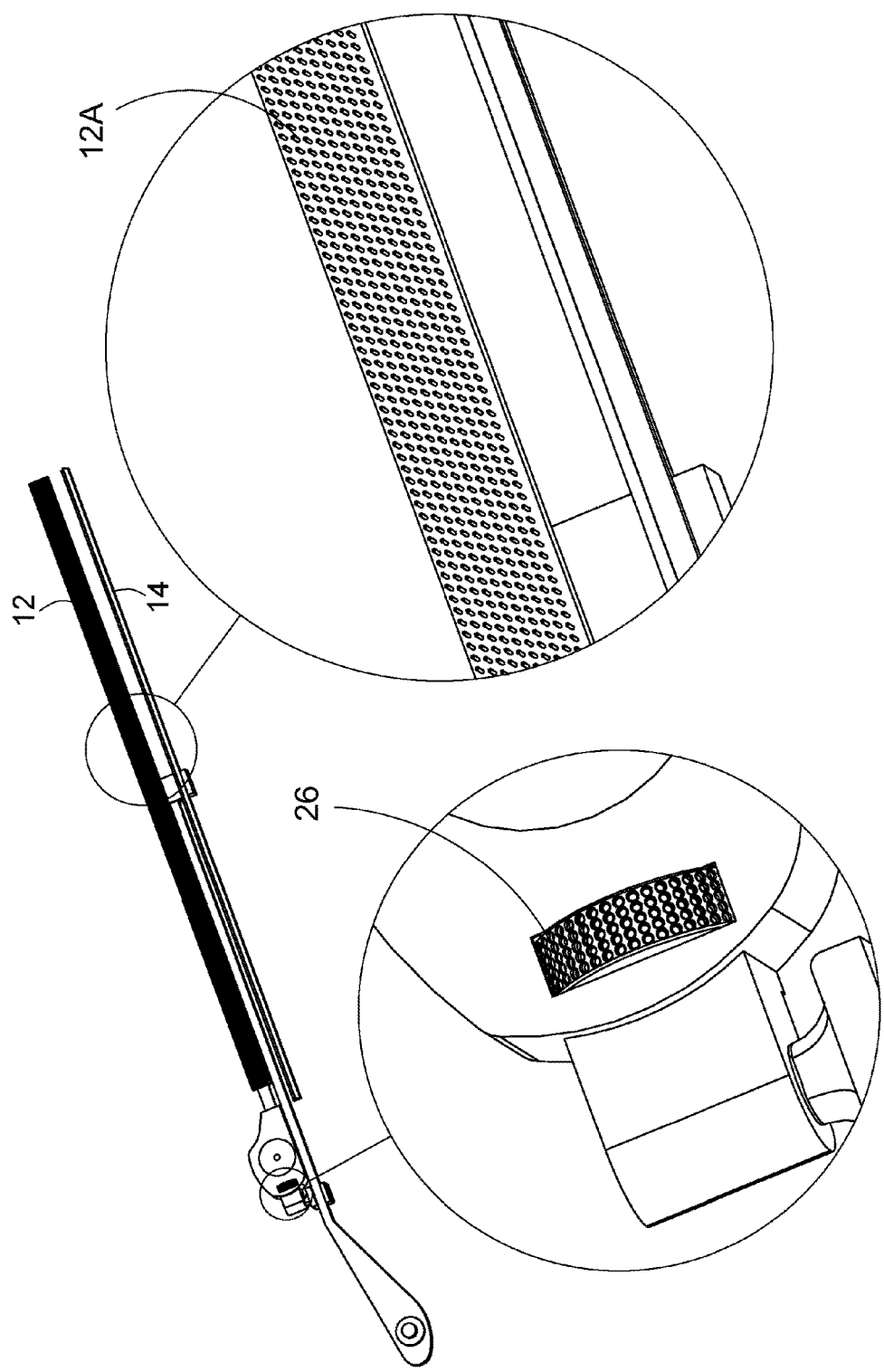
FIG. 3 is a rear view of the window vehicle washer of FIG. 1.

FIG. 3 is a rear view of the window vehicle washer of FIG. 1.

The outer surface of first wheel 26 is coarse, and is coated or surrounded by a rubber material, for rolling on the window 54 and for providing friction force with vehicle window 54, for rotating first wheel 26 by vehicle window 54. A springy element 24 (FIG. 1) presses the outer surface of first wheel 26 towards window 54.

The rear side of the brushing arm 12 includes a brush 12A including bristles, for brushing vehicle window 54.

Figure 4:
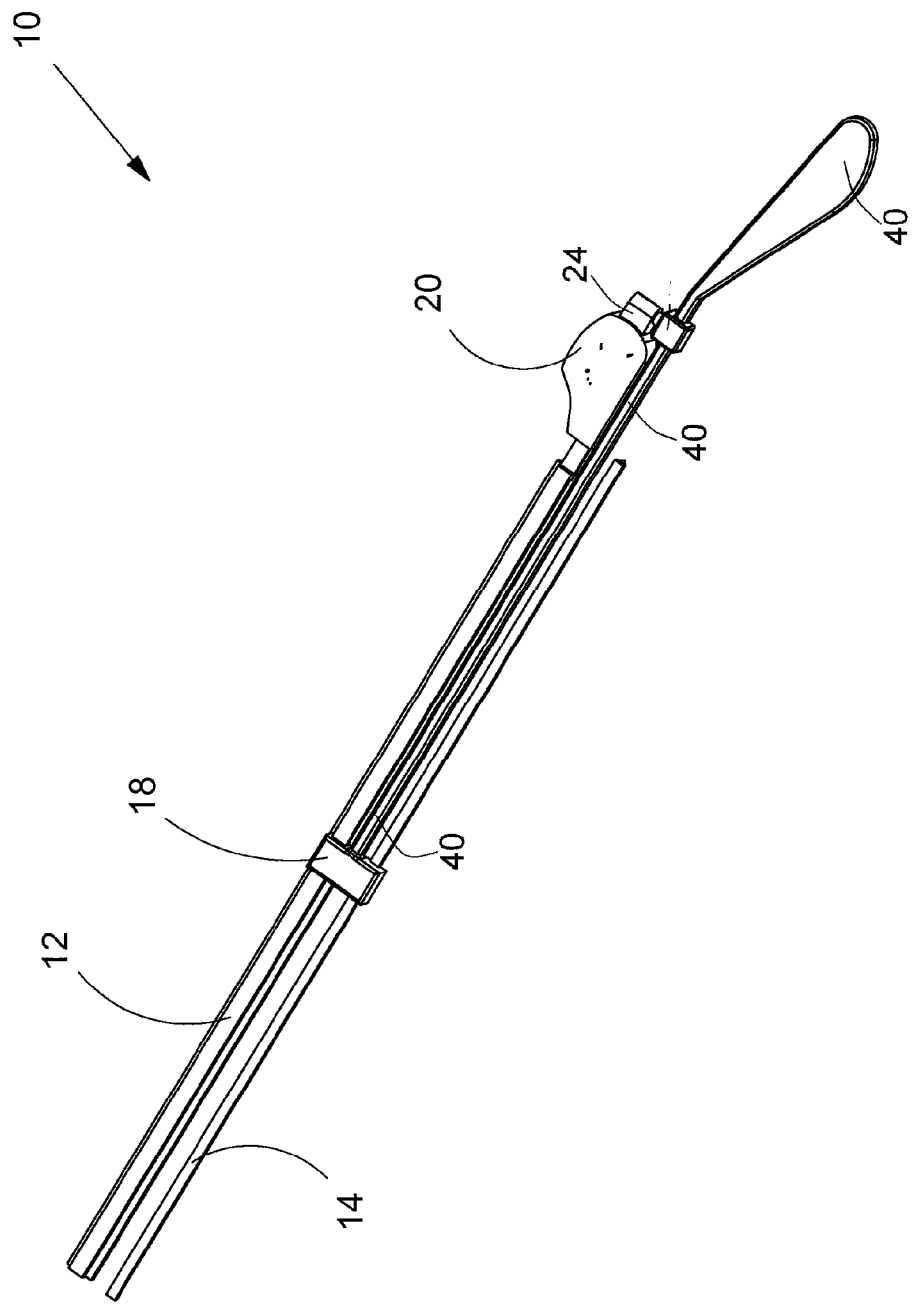
FIG. 4 is an enlarged front view of the window vehicle washer of FIG. 1.

FIG. 4 is an enlarged front view of the window vehicle washer of FIG. 1.

Motion conversion mechanism 20 is fixed to main arm 40 by a connector 20 via a springy element 24 (FIG. 1).

The main arm 40 extends from wiping mechanism 42 of vehicle 16, and ends with a connecting element 18. Wiping arm 14 is rigidly fixed to connecting element 18. Brushing arm 12 is slideably connected to element 18, i.e., allows brushing arm 12 to slide in relation to connecting element 18. Thus, brushing arm 12 extends from main arm 40.

According to another embodiment, main arm 40 may be eliminated, and brushing arm 12 may extend directly from wiping arm 14, or be mounted thereto.

Figure 5:
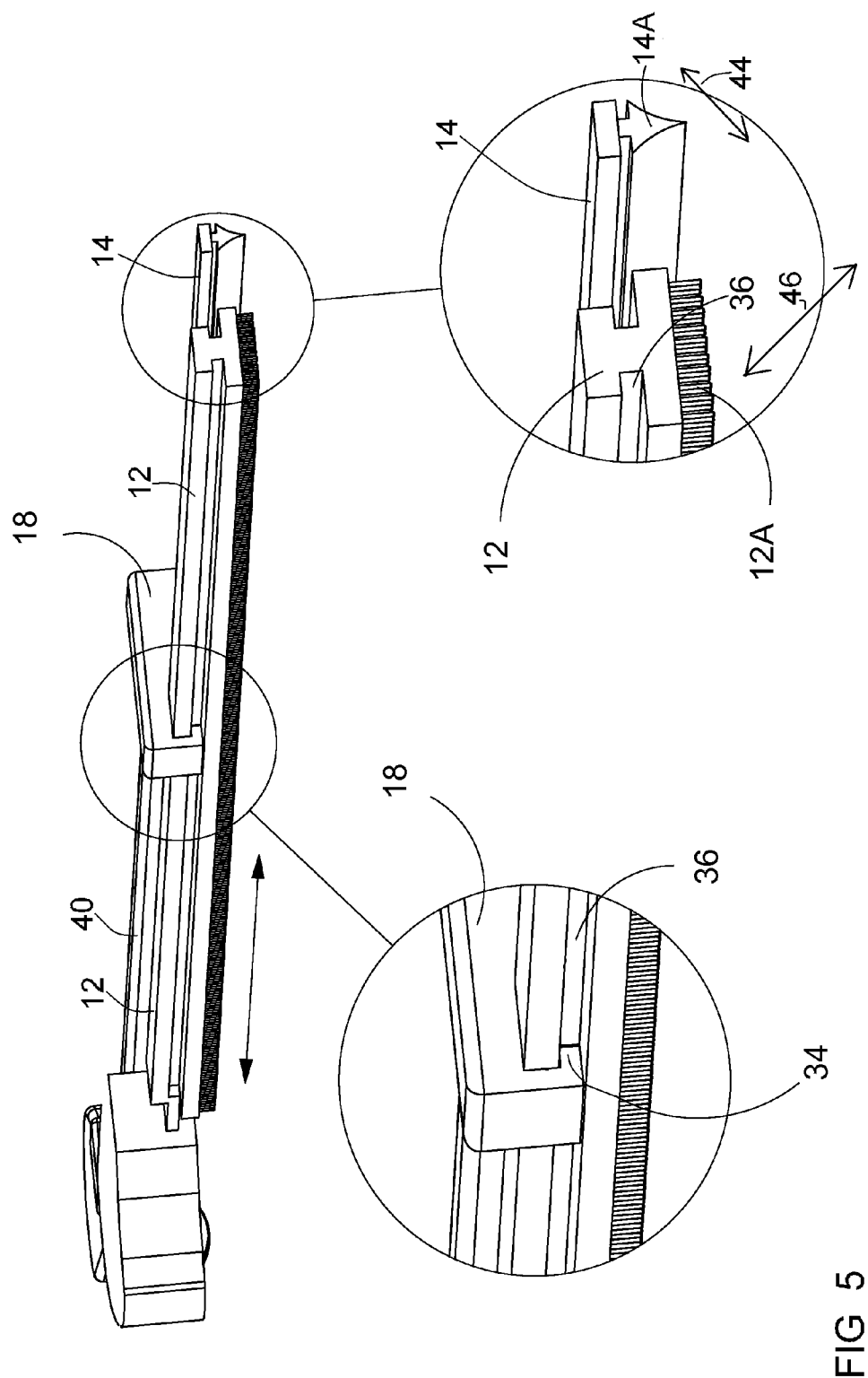
FIG. 5 is an enlarged front view focusing on the connecting element of the window vehicle washer of FIG. 1.

FIG. 5 is an enlarged front view focusing on the connecting element of the window vehicle washer of FIG. 1.

Connecting element 18 includes a protrusion 34 being complementary to a track 36 of brushing arm 12, for allowing brushing arm 12 to slide in relation to connecting element 18.

According to this embodiment, the linear sliding motion 46 of brushing arm 12 is perpendicular to motion 44 of the wiping element 14A and quicker than that of wiping element 14A.

According to another embodiment, the linear sliding motion 46 of brushing arm 12 is parallel to motion 44 of the wiping element 14A and quicker than that of wiping element 14A.

In the figures and/or description herein, the following reference numerals (Reference Signs List) have been mentioned:
  numeral 10 denotes a washer for a window;
  numeral 12 denotes an arm, for brushing the window; a prior art vehicle window washer does not include this arm;
  numeral 14 denotes an arm for wiping the window; a prior art vehicle window washer includes a similar arm;
  numeral 16 denotes the vehicle;
  numeral 18 denotes a connecting element, for connecting arms of the washer;
  numeral 20 denotes a motion conversion mechanism;
  numeral 24 denotes a springy element, for pressing the window;
  numerals 26 and 30 denote cogged wheels;
  numeral 32 denotes an arm of the motion conversion mechanism;
  numeral 34 protrusion of the connecting element;
  numeral 36 denotes a track of the brushing arm, for sliding thereof in relation to the other arm(s);
  numeral 40 denotes the arm extending from the wiping mechanism of the vehicle;
  numeral 42 denotes the wiping mechanism of the vehicle or of the aircraft, etc., which rotates the prior art washer;
  numeral 44 denotes a rotational motion;
  numeral 46 denotes a linear motion;
  numerals 48 and 52 denote cogs;
  numeral 50 denotes a crankshaft; and
  numeral 54 denotes the window.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:
1. A window washer, comprising:
  a brushing arm, mounted to a wiping arm of said window washer; and
  a motion conversion mechanism, for converting back and forth rotational motion of said wiping arm to back and forth linear motion of said brushing arm,
  thereby said brushing arm rotates with said wiping arm motion, and in addition, linearly slides back and forth from said wiping arm, for brushing a window,
  wherein said motion conversion mechanism, for converting the back and forth rotational motion of said wiping arm to linear motion of said brushing arm, comprises a first wheel, being pressed on the window, for being rotated by said window,
wherein said motion conversion mechanism, for converting the back and forth rotational motion of said wiping arm to linear motion of said brushing arm, further comprises:
a crankshaft, for converting the rotation of said first wheel to linear motion of said brushing arm.

2. A window washer according to claim 1, wherein said first wheel comprises a rubber surrounding, for rolling thereon on the window.

3. A window washer according to claim 2, further comprising:
a connecting element,
for rigidly connecting said main arm to said wiping arm, and
for slideably connecting said brushing arm to said wiping arm.

4. A window washer according to claim 1, wherein said wiping arm is rigidly fixed to a main arm extending from a wiping mechanism.

5. A window washer according to claim 1, wherein said brushing arm comprises a brush, for brushing the window.

6. A window washer according to claim 1, wherein said motion conversion mechanism is characterized in converting a single rotational motion of said wiping arm to a plurality of linear back and forth motions of said brushing arm.

7. A window washer according to claim 1, wherein said linear motion of said brushing arm is perpendicular to said rotational motion of said wiping arm.

8. A window washer, comprising:
a brushing arm, mounted to a wiping arm of said window washer; and
a motion conversion mechanism, for converting back and forth rotational motion of said wiping arm to back and forth linear motion of said brushing arm,
thereby said brushing arm rotates with said wiping arm motion, and in addition, linearly slides back and forth from said wiping arm, for brushing a window,
wherein said motion conversion mechanism, for converting the back and forth rotational motion of said wiping arm to linear motion of said brushing arm, comprises a first wheel, being pressed on the window, for being rotated by said window,
wherein said first wheel comprises a spring element, for pressing said first wheel on the window.

9. A window washer, comprising:
a brushing arm, mounted to a wiping arm of said window washer; and
a motion conversion mechanism, for converting back and forth rotational motion of said wiping arm to back and forth linear motion of said brushing arm,
thereby said brushing arm rotates with said wiping arm motion, and in addition, linearly slides back and forth from said wiping arm, for brushing a window,
wherein said motion conversion mechanism, for converting the back and forth rotational motion of said wiping arm to linear motion of said brushing arm, comprises:
a first wheel, being pressed on the window, for rolling along said window;
a second wheel, connected to said first wheel via a gear, for being rotated parallel to said window by said first wheel; and
an arm, pivotally connected to said brushing arm and to said second wheel, for converting the rotation of said second wheel to the linear motion of said brushing arm.

* * * * *